United States Patent

[11] 3,565,269

| [72] | Inventor | Melvin S. Martin<br>Martindale, Pa. 17549 |
|---|---|---|
| [21] | Appl. No. | 799,876 |
| [22] | Filed | Feb. 17, 1969 |
| [45] | Patented | Feb. 23, 1971 |

[54] PIPE LAYING EQUIPMENT
2 Claims, 4 Drawing Figs.

[52] U.S. Cl. ................................................. 214/85;
      61/72.5; 193/5; 214/1
[51] Int. Cl. ................................................. B65g 13/00
[50] Field of Search ................................. 214/85, 84,
      83.26, 3, 1PL, 83.1; 193/2—6; 61/72.5, 72.3

[56] References Cited
UNITED STATES PATENTS

| 333,114 | 12/1885 | Dougine | 61/72.5 |
| 338,678 | 3/1886 | Sullivant | 61/72.5 |
| 1,241,436 | 9/1917 | Peterson | 193/5 |
| 2,336,658 | 12/1943 | Watson | 61/72.5 |
| 2,586,324 | 2/1952 | Graves | 214/83.26 |
| 3,348,646 | 10/1967 | McCall | 193/5 |

FOREIGN PATENTS

| 66,107 | 7/1950 | Netherlands | 61/72.5 |

*Primary Examiner*—Albert J. Makay
*Attorney*—Synnestvedt & Lechner

ABSTRACT: Pipe-laying equipment comprising supporting structure arranged for convenient mounting on and removal from a truck adapted to carry sections of pipe to be laid, the supporting structure providing for support of a feed device for delivering pipe sections in end to end relation in a ditch in which the pipeline is to be laid, the supporting structure further providing for the support of a platform for one or more attendants in position for convenient manual loading of the pipe sections from the truck onto the feed device.

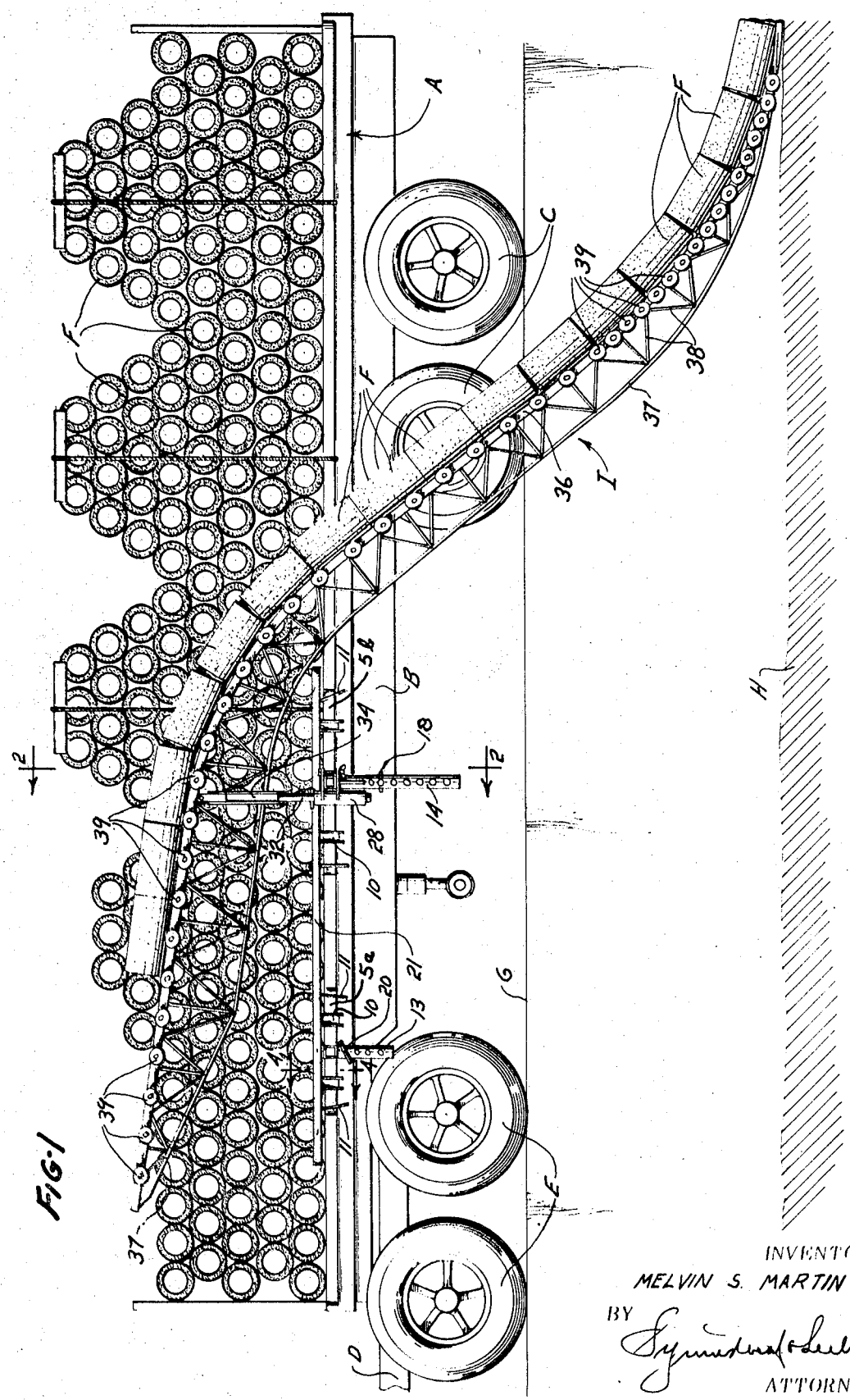

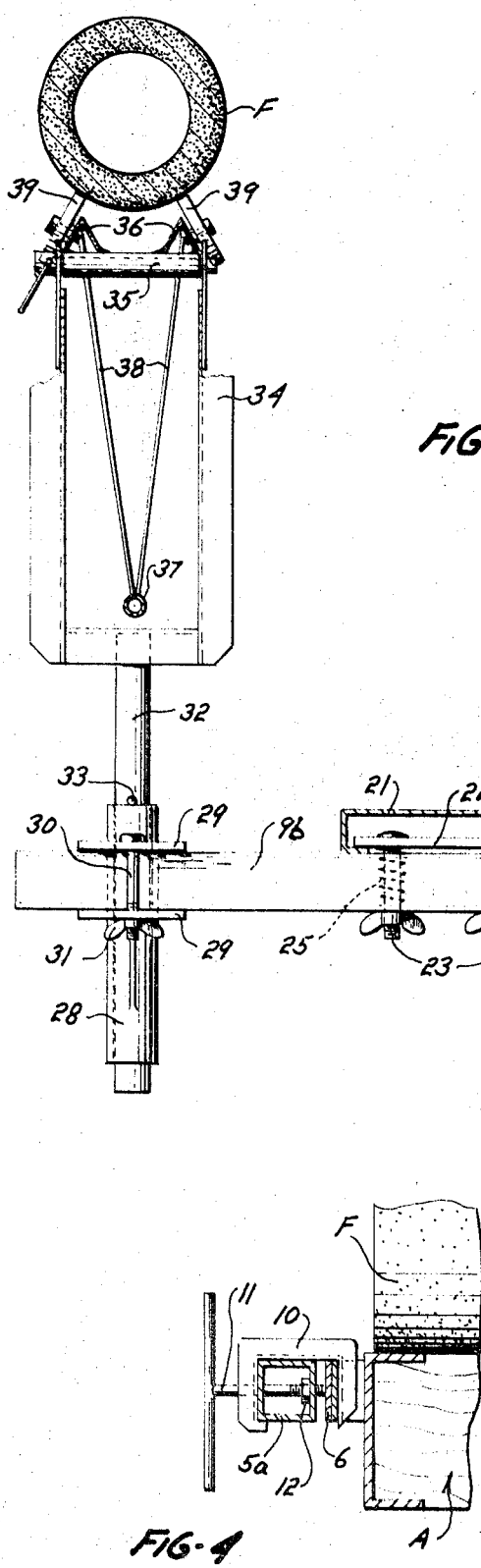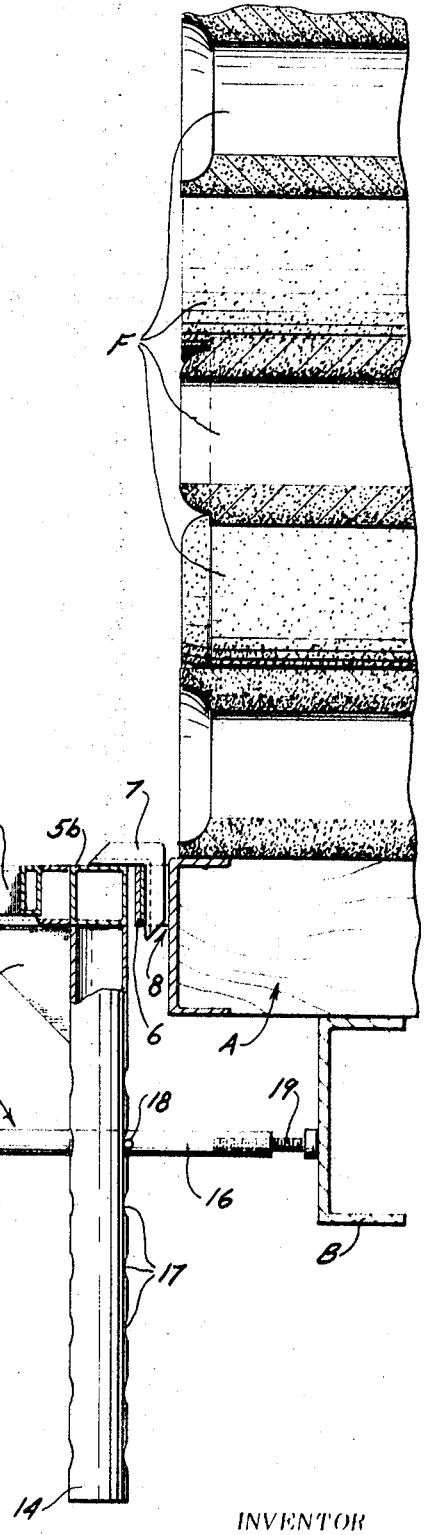

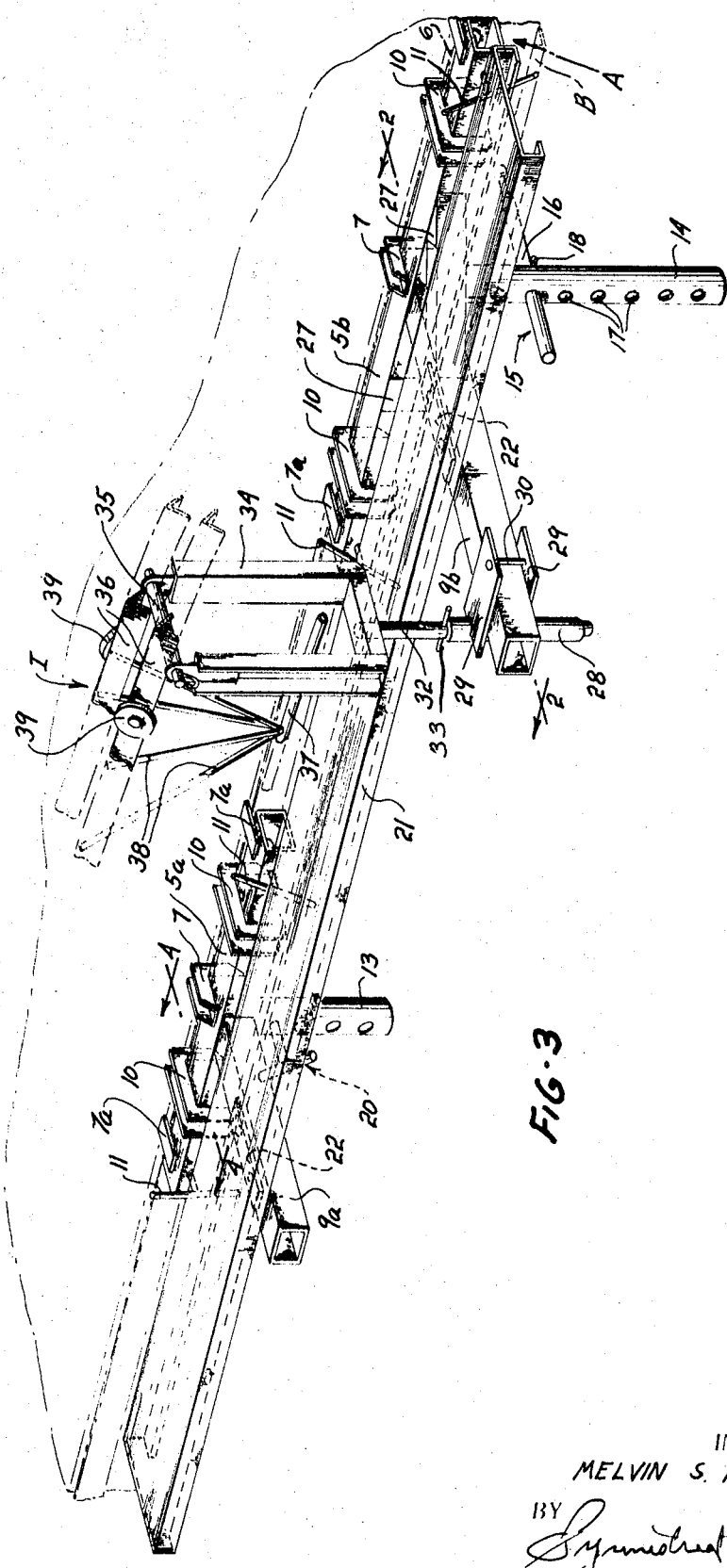

PIPE LAYING EQUIPMENT

This invention relates to pipe-laying equipment, and while certain features of the equipment are adapted for use in various ways, the equipment of the invention is particularly suitable for use with a truck adapted to carry sections of pipe to be laid.

One of the principal objects of the invention is to provide pipe-laying equipment and supporting structure therefor arranged for ready and convenient attachment to and detachment from the edge structure of the bed of a truck carrying a load of pipe sections to be laid.

More specifically, the invention contemplates a simple and sturdy attachment means by which the support structure may be anchored to the sockets commonly provided at the edge of a truck bed for the purpose of receiving stakes along the edges of the truck in order to confine the load to its proper position upon the truck bed.

Other important objectives of the invention are the provision of a virtually automatic system for laying the pipe sections, the system of the invention including an inclined feed device the upper end of which is positioned so that pipe sections may conveniently be loaded onto the feed device by an attendant, the lower end of the feed device being arranged and positioned to sequentially deliver the pipe sections under the action of gravity in a series, for instance, in a pipe trench, with the sections in contiguous end to end relation.

With the feed device mounted upon the truck, as is contemplated, the advance of the truck along ground adjacent to the ditch will automatically serve to deliver the pipe sections into the ditch in proper end to end relation, so that all that is required is for the attendant to load the pipe sections onto the upper end of the feed device from the supply carried by the truck.

A further object of the invention is to compensate automatically for variation in the level of the ground (for instance the bottom of the ditch) on which the pipe is being laid, in relation to the level of the ground on which the truck is traveling. This automatic compensation is provided for by constructing the feed device upon an elongated beam which is mounted on the support structure, and thus on the truck, with freedom for upward and downward pivotal movement of the delivery end of the feed device.

It is a still further object of the invention to provide automatically for compensation of some lateral deviation between the line in which the pipe is to be laid, and the course being followed by the truck. This variation is accommodated by the mounting of the elongated feed device upon a vertically arranged pivot, so that the delivery end of the feed device may swing laterally to a certain degree with relation to the longitudinal axis of the truck body.

How the foregoing objects and advantages are attained will appear more fully from the following description referring to the accompanying drawings, in which:

FIG. 1 is a side elevational view of a truck body, such as a tractor-trailer body, adapted to carry a load of pipe sections, this view showing the pipe-laying equipment and the mounting structure therefor connected with the truck bed at the edge thereof;

FIG. 2 is a vertical sectional view taken generally as indicated by the section line 2-2 on FIG. 1, but illustrating certain of the parts partially in elevation;

FIG. 3 is an isometric view of the support mechanism as secured to the edge of the truck bed, this view also showing parts of the truck bed in dot dash outline and still further showing a small portion of the feed device in the region in which the feed device is pivotally connected with the support structure; and FIG. 4 is a vertical sectional view of certain details of the fastening mechanism for the supporting structure, this view being taken as indicated by the line 4-4 on FIG. 3.

Referring first to FIG. 1, the bed of a trailer-type truck structure is indicated generally at A, this bed being carried upon the frame B and the trailer being provided with wheels such as indicated at C. The rear portion of the frame of the truck tractor is indicated at D, this portion being supported by wheels such as shown at E. The truck bed A is adapted to carry a load of pipe sections shown at F and it is here assumed that it is desired to lay these pipe sections in a line along the bottom of a ditch cut in the ground G in a position offset to a side of the area on which the truck is traveling. The bottom of this ditch is indicated in FIG. 1 at H.

A feed device generally indicated in FIG. 1 at I is mounted upon supporting structure fastened to the edge of the truck bed A in position so that an attendant may readily load pipe sections onto the feed device from the supply carried by the truck. The lower end of the feed device being extended downwardly to the bottom H of the ditch for delivery of the pipe sections in an end to end series along the line in which it is desired to lay the pipe.

Turning now to the mounting structure, it is first noted that this structure is made up of a number of parts which may readily be handled manually and which may be quickly and conveniently attached to a truck bed, for instance to a truck bed of the type having stake sockets along the edges thereof.

Two support members in the form of hollow rectangular beams 5a and 5b are positioned in spaced end to end relation along the edge of the truck bed, preferably just outside of the rub rail 6. Each of these beams is provided with a hook 7 intermediate its ends adapted to engage in a stake socket 8, one of which clearly appears in FIG. 2. Straps 7a adjacent the ends of beams 5a and 5b aid in positioning the beams at the desired height. Each of the beams 5a and 5b carries a transverse support element 9a and 9b which is rigidly connected thereto.

Each of the beams 5a and 5b is further provided with a pair of loose or separable clips 10 of U-shape which embrace the beam and also the adjacent rub rail with some small clearance as will clearly be seen in FIG. 4. Jack screws 11 are threaded in the end portions of each beam 5a and 5b in position to react against the outer face of the rub rail 6 (see FIG. 4) thereby providing for securely fastening the beams 5a and 5b to the edge of the truck bed, in the manner which will be clear from inspection of FIG. 4. A nut 12 may be associated with each jackscrew 11 in order to fix the screw in its tightened position. The engagement of the hook 7 in stake sockets serves to prevent longitudinal movement of the beams 5a and 5b along the side of the truck.

The beam 5a still further carries a depending tubular element or strut 13, and the beam 5b carries a similar strut 14, each of these structures being apertured to receive an adjustable jack device adapted to abut against the frame B of the truck. One of these adjustable jack devices is seen most clearly in FIG. 2 at 15, this being associated with the strut 14 and comprising a cylindrical part 16 adapted to be inserted into any one of the series of transverse apertures 17 formed in the strut 14. The member 16 has a transverse pin 18 which will prevent the member 16 from passing all the way through the apertures in the strut 14. At its inboard end, the member 16 is in threaded engagement with the screw 19 adapted to abut against the frame B of the truck. In this way the support structure is readily adaptable to trucks of a variety of sizes, shapes and dimensions. The jack device 15 thus serves to assist in the cantilever support of the supporting mechanism at the edge of the truck bed.

The strut 13 fastened to the beam 5a is also provided with a jack device 20 which may be of construction similar to that of the device 15 described above.

The two transverse supporting elements 9a and 9b provide for the support of a platform or catwalk 21 (see particularly FIGS. 2 and 3). This may take the form of a channel member having inturned lips at the free edges of the channel flanges adapted to engage under the fastening plates 22. Two of these plates 22 are provided, one being mounted on the transverse support element 9a and the other on the corresponding element 9b, as by means of bolts 23 provided with wingnuts 24 for convenient manipulation in assembly and disassembly of the supporting structure. If desired, compression springs 25 (see FIG. 2) may be associated with the plates 22, these springs reacting between the inside surface of the bottom wall of the transverse member 9a or 9b and bearing against the plate 22, so that the springs tend to hold the plate displaced upwardly from the top of the transverse element 9a or 9b until the wingnuts 24 are tightened. This facilitates assembly or mounting of the catwalk. It will now be apparent that the catwalk itself will also serve as a brace extending between the two transverse support elements 9a and 9b.

The transverse element 9b is used to support the upper end of the feed device I for the pipe sections F, and to add strength and bracing to this transverse element 9b, a web brace 26 is provided between the element 9b and the strut 14, and tubular diagonal braces 27 are provided between the transverse element 9b and the beam 5b.

For the purpose of mounting the pipe section feed device, a vertical socket 28 is connected with the outer end of the transverse element 9b, for instance by means of plates 29–29 welded to the socket 28 and embracing the element 9b, these plates being securely fastened together by the bolt 30 provided with a wingnut 31.

A post 32 is removably associated with the socket 28, the post having a limiting stop 33 so as to retain the post at the proper elevation. Post 32 carries the yoke 34 at the upper end of which a transverse pivot structure 35 serves to mount the elongated feed device I, this mounting arrangement being most clearly seen in FIGS. 2 and 3, the latter of which shows a fragmentary length of the feed device.

Turning now to the construction of the feed device itself, it will be seen from FIGS. 1, 2 and 3 that this device is constructed in the manner of a beam comprising three principal longitudinal elements, two of which advantageously take the form of angle members 36–36, and the third of which comprises a structural tube 37. These longitudinal elements are all interconnected by means of bracing elements 38, so that the beam structure of the feed device is a rigid unit throughout its length.

As will be seen from FIGS. 2 and 3, each of the angle members 36 is positioned with its apex presented upwardly. Along the outer face of each of the two angle members 36 a series of rollers 39 are rotatively mounted and from FIG. 2 it will be clear that these rollers rotate in planes which converge upwardly so that they provide effective and convenient support for the pipe sections. The spacing of the rollers lengthwise of the feed device I is in all regions considerably less than the length of the pipe sections to be handled, so that in any position the pipe sections will be adequately supported. Some variation in spacing is provided in a lower region for a purpose to be mentioned hereinafter.

From inspection of FIG. 1 it will be seen that the beam of the feed device I is somewhat S-shaped and that its upper end is positioned more or less horizontally at an elevation somewhat above the truck bed A. This is the loading region of the feed device and is conveniently accessible by one or more attendants standing on the catwalk 21 carried by the support structure, which catwalk, as will be observed from FIG. 2, is positioned intermediate the feed device and the supply of pipe sections carried on the truck.

From this upper loading region of the feed device, the feed device curves downwardly into a rather steeply inclined section constituting the intermediate or mid region of the feed device. Toward its lower end, the beam of the feed device is curved reversely to the first curvature so as to approach parallelism with the bottom H of the ditch near the delivery end of the feed device. In this latter curved region, the spacing between the supporting rollers 9 is preferably diminished in order to be sure that the leading ends of the pipe sections will not have a tendency to catch on rollers and to ensure smoothness of the feeding action in that region.

In further describing the use of the equipment illustrated in the drawings, it is assumed that the equipment is being employed to handle and lay a drain pipeline of the type commonly made up of porous ceramic pipe sections which are laid end to end with interfitting bell and socket ends but not necessarily with cemented or sealed joints. It is customary for such drain pipelines to be laid in a ditch alongside of a road or alongside of other areas on which a truck may readily travel. It has been common heretofore to drive a truck along such a ditch and while doing so to have one or more attendants manually drop the approximate number of pipe sections needed, after which other personnel working in the ditch will assemble the pipe sections in end to end relation. When the pipe has been laid the ditch is of course covered over.

With the equipment of the present invention, the truck carrying a load or supply of pipe sections is driven alongside of the ditch and the mounting structure with the feed device is connected with the truck bed at the side thereof presented toward the ditch. The feed device is mounted in spaced relation to the truck body so that the delivery end thereof may readily be positioned in the ditch and will readily be drawn along the bottom of the ditch by the motion of the truck. With attendants working on the platform or catwalk 21 the pipe sections may readily be manually transferred from the truck to the loading end of the feed device. These pipe sections will advance downwardly on the feed device and be laid sequentially in end to end relation as the truck advances. The feed of the pipe sections is thus automatic, since gravity causes the series of pipe sections carried on the feed device to advance downwardly to the delivery end.

Preferably the inclination of the feed device, and especially the inclination of the intermediate portion is sufficiently steep so that the action of gravity acting upon the pipe sections will deliver the pipe sections in a manner so that each one will contact the immediately preceding section along the line of the pipe. Thus, the action of gravity assures contiguity of the sections as laid in the ditch.

To secure proper "tracking" action of the feed device it is preferred that the device be mounted upon its support in a region not too remote from the upper or loading end and, in any event, well above the midpoint in considering the overall length of the feed device. Quite accurate tracking will occur automatically both in the horizontal and vertical planes, the feed device being free to swing in the horizontal plane about the vertical axis of pivoting provided by the post 32 which is received in the socket 28, and being free to swing in the vertical plane about the horizontal axis of the pivot structure 35.

The arrangement of the mounting mechanism or structure is highly desirable because it makes possible application of the mounting structure and thus of the pipe section feed device at either side of the truck. Moreover, the mounting structure is made up of parts which can readily be manually handled by attendants and which may easily be applied to truck structures of a variety of types and dimensions. These features are of importance in expediting the pipe-laying operation and thus minimizing time and labor required.

I claim:

1. Pipe-laying equipment adapted to be mounted on a truck or other vehicle having a bed with stake sockets along an edge thereof, a platform support including mounting means removably engageable with at least one stake socket, a platform carried by said support at the side of the truck, and an elongated pipe feed device removably carried by the platform support in position to provide for manual loading of pipe sections on the feed device by an attendant on said platform, in which the platform support comprises a member extended along the truck bed, the removable mounting means comprising at least one hook element secured to said member intermediate the ends thereof and being removably engageable with a stake socket, at least one generally U-shaped loose clip adapted to embrace said member and a structural piece at the edge of the truck bed in a position longitudinally offset from the hook element, and a screw jack device adapted to react between said member and the truck and cooperating with the hook element and loose clip to secure the support in position at the edge of the truck bed.

2. Equipment as defined in claim 1 in which the platform support further includes an adjustable brace extended to engage the truck frame below the truck deck.